No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 1.

Fig. 1.

Witnesses.
Harry L. Cot.
Horace Grellier.

Inventor
Edward Thomas Cleathero,
per Chas. S. Woodroffe
Attorney.

No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 4.

Fig. 4.

Witnesses.
Harry S. Cot
Horace Grellier.

Inventor
Edward Thomas Cleathero,
per Chas S Woodroffe
Attorney.

No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 5.

No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 6.

Fig. 6.

Witnesses.
Harry L. Bot.
Horace Grellier.

Inventor
Edward Thomas Cleathero,
per
Attorney.

No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 7.

No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 8.

Witnesses.
Inventor
Edward Thomas Cleathero,
per
Attorney.

No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 10.

Fig. 10.

No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 11.

Fig. 11.

Witnesses.
Harry L. Cot.
Horace Grellier

Inventor
Edward Thomas Cleathero
per ... Woodroffe
Attorney.

No. 747,939. PATENTED DEC. 29, 1903.
E. T. CLEATHERO.
PLATEN PRESS, SUCH AS IS USED FOR PRINTING, STAMPING, OR THE LIKE.
APPLICATION FILED JUNE 24, 1901.
NO MODEL. 13 SHEETS—SHEET 12.

No. 747,939. Patented December 29, 1903.

UNITED STATES PATENT OFFICE.

EDWARD THOMAS CLEATHERO, OF ALTRINCHAM, ENGLAND.

PLATEN-PRESS, SUCH AS IS USED FOR PRINTING, STAMPING, OR THE LIKE.

SPECIFICATION forming part of Letters Patent No. 747,939, dated December 29, 1903.

Original application filed May 20, 1901, Serial No. 61,124. Divided and this application filed June 24, 1901. Serial No. 65,850. (No model.)

*To all whom it may concern:*

Be it known that I, EDWARD THOMAS CLEATHERO, of The Hollies, Barrington road, Altrincham, in the county of Chester, England, have invented certain new and useful Improvements in Platen-Presses such as are Used for Printing, Stamping, or the Like; and I do hereby declare the following to be a full, clear, and exact description of the invention, such as will enable others skilled in the art to which it appertains to make and use the same.

This invention is a division from my application, Serial No. 61,124, filed May 20, 1901, relates to platen-presses such as are used for printing, stamping, and the like, and will be best understood by reference to the accompanying drawings, in which—

Fig. 8ª is a sectional elevation of a part of Fig. 8, showing the grippers open.

The detail drawings shown in Figs. 5 to 13, inclusive, are represented on a scale larger than that to which the others figures are drawn.

Throughout the several figures of the drawings similar numerals of reference are used to indicate similar parts of the press.

In constructing a press according to this invention two side frames 1 and 2 are provided, having bearings for carrying the various operating-shafts. The short shaft 3 is that which is first operated from any suitable outside source of rotary motion through the medium of a fast pulley 4 (5 representing the loose pulley) or otherwise, as may be desired. The said shaft is supported at one end in a bearing in the side frame 1 and at the opposite or outer end in a plumber-block bearing 6 and has secured on it a spur-pinion 7, gearing with a wheel 8, rotating on a stud 9, secured in the side frame 1. The spur-wheel 8 gears with a wheel 10 of half its diameter, secured on one end of a crank-shaft 11, rotating in bearings 12, extending inward from the side frames 1 and 2 and supported on a bed 13.

The crank 14 at or near the center of the shaft 11 engages with the lower end of a connecting-link 15, whereof the upper end is pivoted on a shaft 16, whose ends eccentric in relation to the central part 16ª and concentric with each other are journaled in lugs or bearings 17, depending from the type or die bed 18. The type or die bed 18 is provided at its ends with slides 19, which travel vertically on guides 20, fixed to the side frames 1 and 2 when the bed 18 is reciprocated by the crank 14.

On the right-hand end of the crank-shaft 11 is secured a disk 21, carrying a crank-pin 22, pivoted to the lower end of a rod 23, at the upper end of which is formed a toothed rack 24, which is held in engagement with a spur-wheel 25 by a guide-roller 26, pivoted on the side frame 1. The spur-wheel 25 is mounted loosely on one end of the platen-shaft 27, being retained thereon by a nut and washer 28, as shown clearly in Figs. 5 and 6. The spur-wheel 25 is or may be formed integral with a disk or plate 29, provided at its inner side with guides 30, in which a tooth or pawl 31 is capable of sliding radially in relation to the axis of the shaft 27. On the tooth 31 is pivoted an antifriction-roller 32, adapted when the plate 29 is oscillated by the rack 24 and spur-wheel 25 to be successively engaged by two cams 33 and 34, hereinafter more particularly described.

35 is a disk rigidly secured on the platen-shaft 27 between the outer side of the frame 1 and the oscillating plate 29. This disk is provided with two diametrically opposite recesses 36, with which, as hereinafter more fully described, the tooth or pawl 31 is engaged for rotating the platens and from which it is released when during the continued oscillation of the toothed wheel 25 and plate 29 the platen is to remain at rest.

Figure 6:
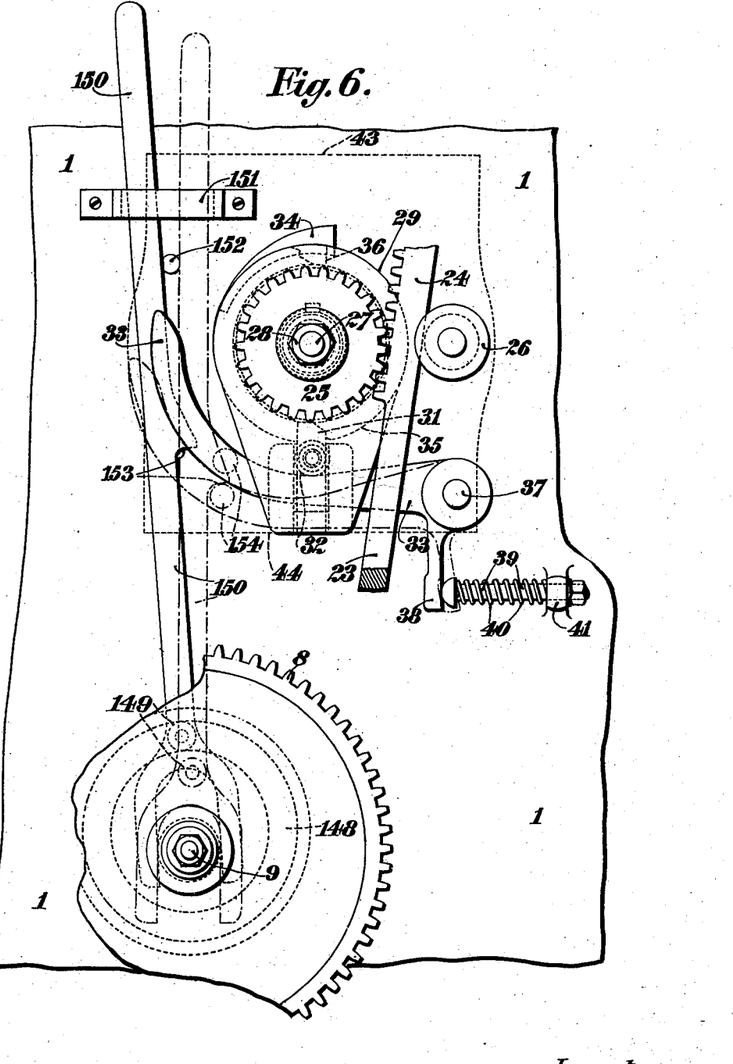
Figure 7:
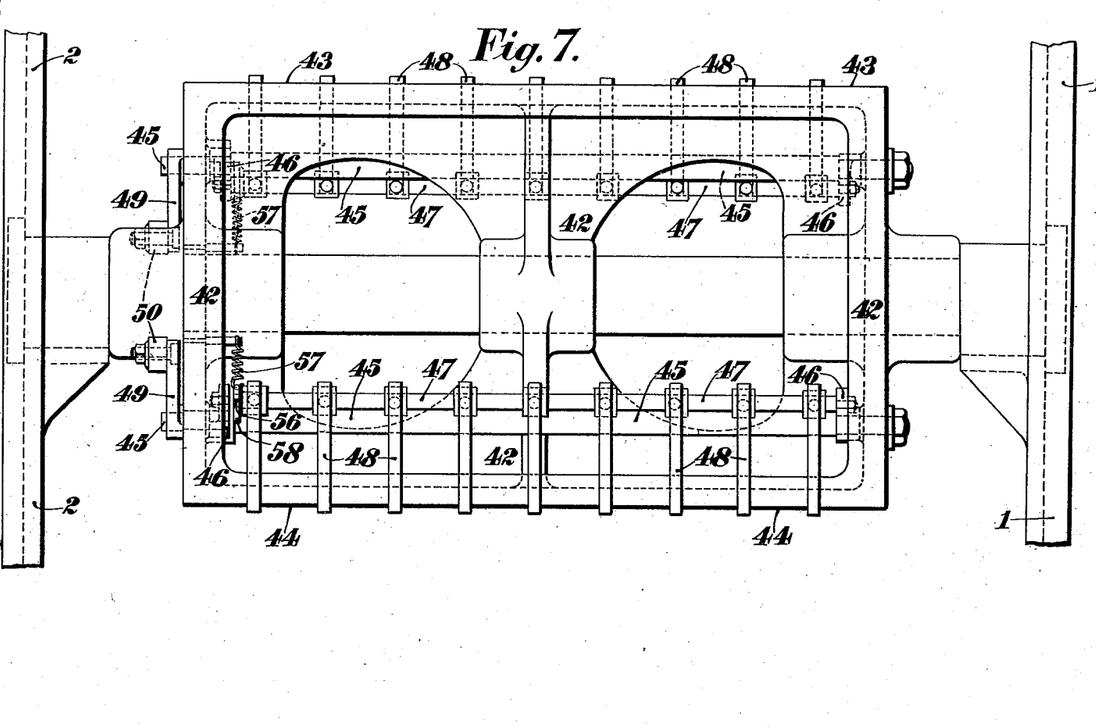
Fig. 7 is a front elevation of the platen.

The before-mentioned cam 33 is pivoted at 37 to the side frame 1 and is provided with an arm 38, against which a plunger or rod 39 is pressed by a spring 40, abutting against a lug 41, projecting from the frame 1, the tendency of the said spring being always to raise the cam 33 into the position in which it is shown in full lines in Fig. 6. The cam 34 is rigidly secured to the side frame 1 above the axis of the platen-shaft 27 and raises the tooth 31 out of engagement from the recesses 36 when the antifriction-roller 32 is moved along the said cam. When the toothed rack 24 is in its lowest position, the tooth 31 is at the upper end of its stroke and held out of engagement from the then upper recess 36 by the fixed cam 34. During the ascent of the rack 24 the tooth or pawl 31 travels downward free of the disk 35, the roller 32 passing first over the fixed cam 34 and then over the pivoted cam 33, the latter being pressed downward against the influence of the spring 40 by reason of the inner end of the tooth 31 traveling upon the periphery of the disk 35. When the tooth 31 reaches the then lower recess 36, it is immediately pressed thereinto by the spring 40 acting through the cam 33 on the roller 32, so that during the next ensuing descent of the rack 24 the spur-wheel 25 is locked to and rotated (through half a revolution) as if in one piece with the platen-shaft 27.

The platen-shaft 27 has secured on it a platen-frame 42, having two diametrically opposite platens 43 44 and carrying two shafts 45, each provided with two arms 46, in which is journaled a shaft 47, whereon are adjustably secured any desired number of grippers 48, serving to grip the material to be printed or stamped against or upon the adjacent edge of the platen 43 or 44. One end of each of the shafts 45 projects outwardly through the platen-frame 42 and has secured on it an arm 49, carrying an antifriction-roller 50, adapted to be engaged by a cam 51, formed on the upper end of a lever 52, pivoted at 53 to the adjacent side frame 2. The lower end of the cam-lever 52 is provided with a cam-slot 54, within which works an arm or projection 55, extending from the vertically-reciprocating type or die bed 18, the said arm during its ascent causing the cam 51 to move forward (from a position in which it is out of the path of the rollers 50) to beneath, and thereby raise the then uppermost of the rollers 50 to open the grippers and for a given time maintain the said grippers open. During the first part of the descent of the arm or projection 55 it still keeps the cam 51 forward under the roller 50, and during the latter part thereof it withdraws the cam from the path of the roller 50 and allows the grippers 48 to close.

Figure 8:
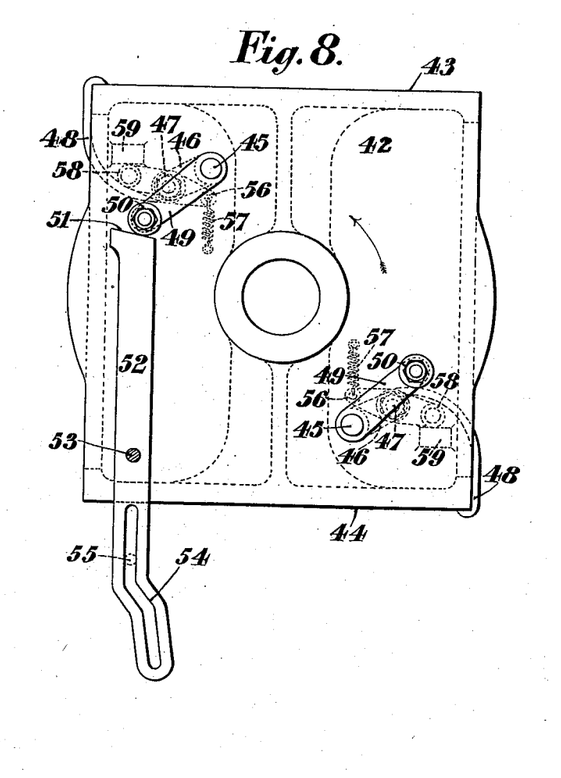
Fig. 8 is an elevation of the left-hand end of Fig. 7.
Figure 8A:
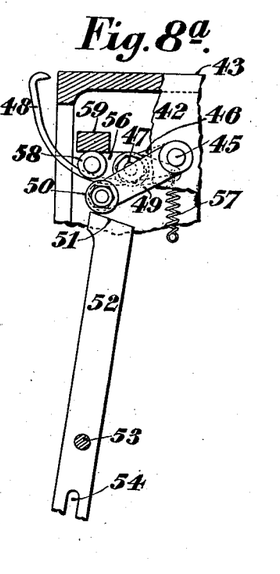

Each of the gripper-shafts 47 has secured on it a lever 56, whereof one end is connected to a spring 57, attached to the platen-frame 42, and the other end is provided with an antifriction-roller 58, which, by the said spring, is constantly held in contact with a lug or projection 59, formed on or rigidly secured to the platen-frame 42. By this arrangement the springs 57, while tending always to keep the grippers 48 closed, allow them to be opened by the forward tilting of the lever 52, as shown in Fig. 8ª, and to be closed when the lever 52 is tilted rearward.

At the upper part of the side frames 1 and 2 inclined guides 60 are formed for receiving rollers 61, pivoted on the end plates 62 of the feed and delivery carriage 63. In the end plates 62 are mounted four gripper-shafts 64, 65, 66, and 67, of which the two former carry the feed-grippers 68 and 69, respectively, and the two latter carry the delivery-grippers 70 and 71, respectively. The shafts 65 and 67 are rigidly secured in the end plates 62 and serve as tie-rods to secure the rigidity of the feed and delivery carriage. On the right-hand end of each of the shafts 64 and 66 is secured an arm 72, on which is pivoted an antifriction-roller 73, adapted to engage with cams 74 and 75 and a hump 75ª on a rod 76, guided near its front end by a slot 77 in the said rod, working on a pin 78, fixed to the adjacent side frame 2. The shafts 64 and 66 are provided with springs 79 and 80, Fig. 12, respectively, which tend always to force the movable grippers 68 and 70 toward the relatively fixed grippers 69 and 71.

Near its rear end the cam-rod 76 is connected to one arm of a bell-crank lever 81, pivoted at 82 to the side frame 2, and of which the other arm is pivoted to the upper end of a rod 83, reciprocated vertically in a fixed guide 84 by a cam 85, secured on the before-described crank-shaft 11.

The feed and delivery carriage 63 is reciprocated in the guides 60 by means of the following mechanism, comprising two links 86, which at respectively opposite ends are pivoted to the carriage end plates 62 and to two lever-arms 87, the latter secured on a rocking-shaft 88, supported in bearings 89 in the main side frames 1 and 2, the said shaft being rocked through the medium of a lever-arm 90, forked rod 91, and antifriction-roller 92 by a cam-groove 93, formed in a disk 94, secured on the crank-shaft 11.

To retain the platen-frame 42 in proper position—i. e., with the two platens 43 44 horizontal—during the printing or stamping operation, there is provided the following locking mechanism, comprising two rigidly-connected locking-arms 95, adapted to engage with lugs or stops 96, projecting from the left-hand end of the platen-frame 42, the said arms being pivoted between fixed lugs 97 on the adjacent side frame 2 and rocked into and out of the path of the lugs or stops 96 by means of a lever-arm 98, which may, as shown in the drawings, pass through a slot in the frame 2 and be integral with the locking-arms, jointed links 99, a lever 100, and a cam 101, formed on the periphery of the before-described disk 94. A spring 100ª is provided to maintain the lever 100 in operative connection with the cam 101.

The inking mechanism comprises a carriage 102, having rollers 103, which run in horizontal guides 104, formed at the inner sides of the main frames 1 and 2. To the inking-carriage 102 are connected two links 105, pivoted to two lever-arms 106, secured to a rocking shaft 107, supported in bearings in the main frames 1 and 2, the said shaft being provided with a third lever-arm 108, which through a link 109 and lever 110 is oscillated by a cam 111, formed in the before-described cam-disk 94. The inking-carriage 102 is formed with open bearings or vertical guides 112, in which the spindles of the two compo inking-rollers 113 and the intermediate riding-roller 114 are free to rotate and ascend and descend. The spindles of the compo inking-rollers 113 are provided with the usual metal rollers, which during the reciprocation of the inking-carriage 102 travel successively over track-rails 115 116, of which the former are rigidly secured to the two side edges of the type or die bed 18, and the latter at their rearward ends are pivoted to the track-rails 115 and at their forward ends are slotted and guided on pins 117, secured in the adjacent main frames 1 and 2. The shaft 118 of the inking-drum 119 has secured on its right-hand end a spur-pinion 120, gearing with the before-described wheel 8 and, through intermediate spur-wheels 121 and 122, with a pinion 123, keyed on the shaft 124 of the ink ductor-roller 125. This roller is rotated against the flexible wall of the ink-trough 126, which wall in the usual well-known manner may be adjusted by set-screws 127 to regulate the supply of ink carried out of the trough 126 on the surface of the ductor-roller 125. Three distributing-rollers 128 128 and 129 rotate in contact with the inking-drum 119 and the ink is transferred from the ductor-roller 125 to the distributing-roller 129 by a swinging ductor-roller 130, which is caused to oscillate between the two said rollers and for periods of the desired duration remain in contact therewith by any of the well-known and hitherto used arrangements of cam mechanism, which it has not been considered necessary to represent in the drawings.

To throw off an impression or, in other words, to prevent an impression on a platen-blanket when there is no blank sheet fed to it, the following mechanism (illustrated most clearly in Figs. 9, 10, and 11) is provided: On the left-hand end of the before-described shaft 16 16ª is secured a spur-pinion 131, in gear with a toothed sector 132, pivoted at 133 to the type or die bed 18 and having a forwardly-projecting lever-arm 134, on which is pivoted an antifriction-roller 135. This roller is adapted to engage with a stationary arm or bracket 136, rigidly secured to the main frame 2, and to be engaged by a pawl or hook 137, pivoted at 138 to the main frame and having a counterweight or weighted arm 139, which constantly tends to move the pawl or hook 137 into or maintain it in the path of the roller 135 as the latter is raised and lowered during the vertical reciprocation of the type or die bed 18. Pivoted to the counterweight 18 is a swivel-eye 140, through which passes the lower end of a rod 141, having a shoulder 142 to bear on the eye 140, and thereby move the pawl or hook over the roller 135, the shoulder being held down onto the eye 140 by a compression-spring 143, which exerts its pressure between the under side of the eye 140 and the nuts 144, adjustable on the rod 141. The upper end of the rod 141 is pivoted on a crank-pin 145, carried by a short shaft 146, on the end of which, projecting at the outside of the main frame 2, is secured a crank-handle 147.

Figure 9:
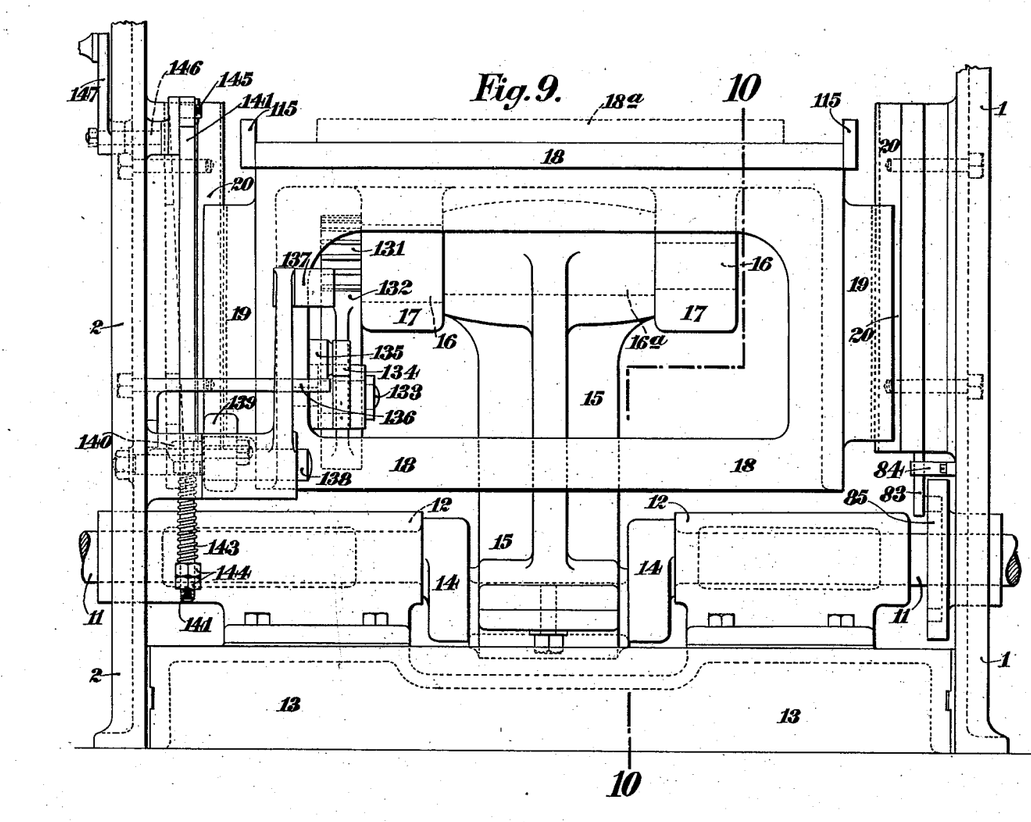
Fig. 9 is a rear elevation of the type or die bed and its operating mechanism.
Figure 10:
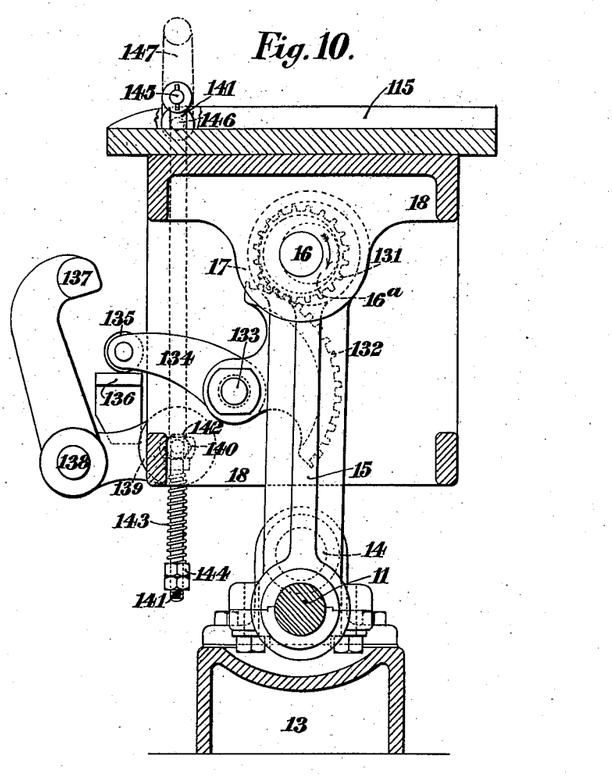
Fig. 10 is a vertical section on the crooked line 10 10 of Fig. 9.
Figure 11:
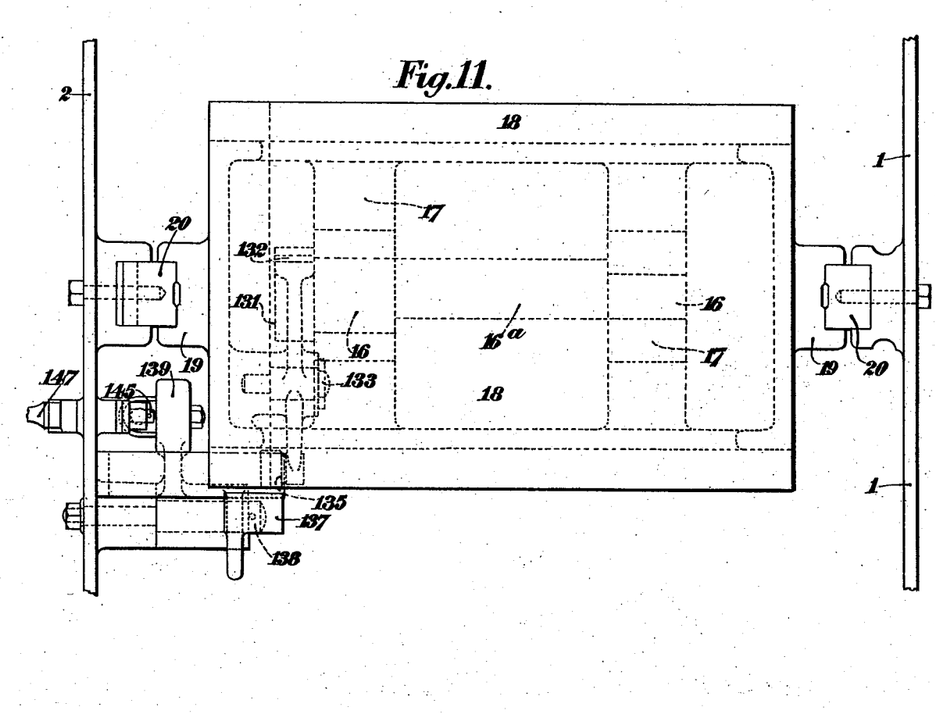
Fig. 11 is a plan of Fig. 9.
Figure 12:
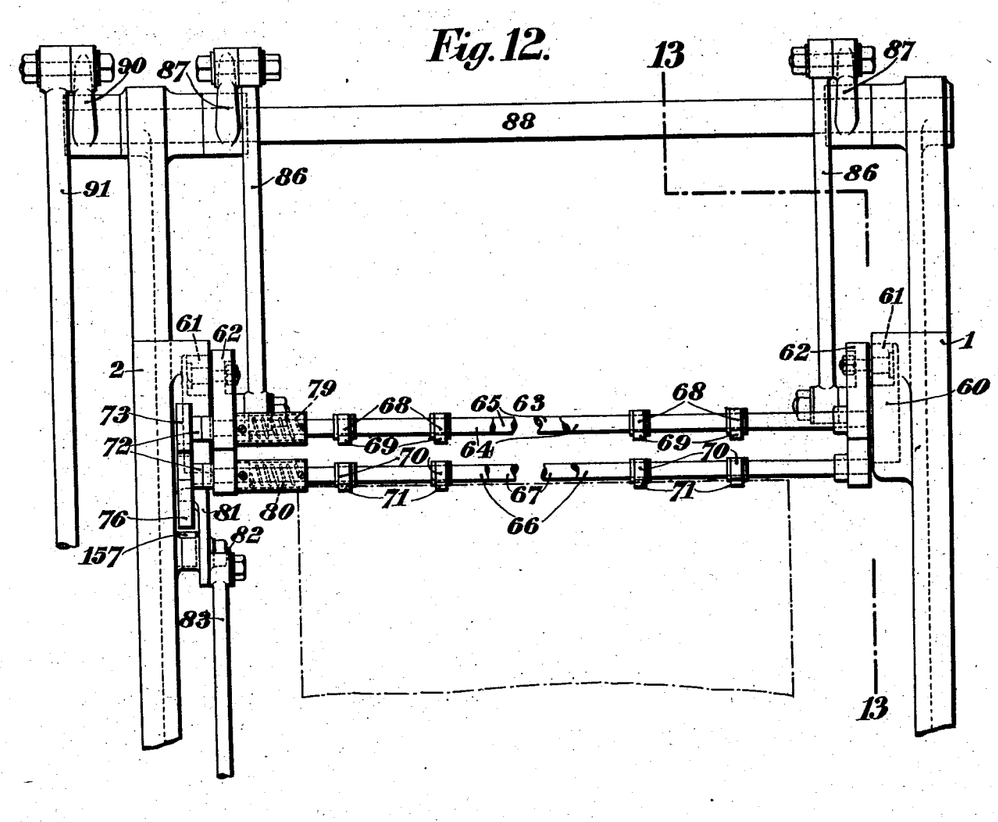
Fig. 12 is a front elevation of the feed and delivery carriage and its operating mechanism.
Figure 13:
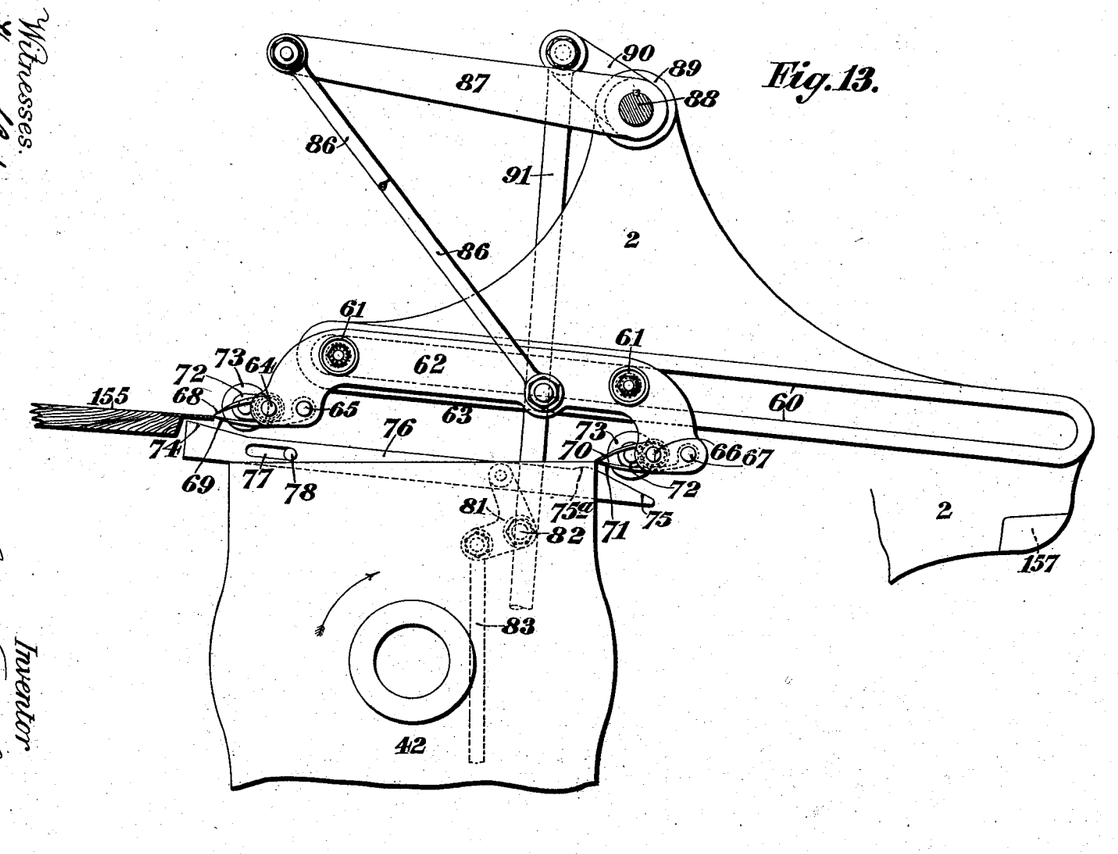
Fig. 13 is a vertical section on the crooked line 13 13 of Fig. 12.

In the normal condition of working of the press the crank-handle 147 is horizontal, and the pawl or hook 137 extends into the path of the roller 135, so that at each ascent of the type or die bed 18 by the arrestment of the roller 135 and the movement of the fulcrum 133 in relation to said roller the toothed sector 132 is rocked on 133 and the shaft 16 16ª is turned in the direction indicated by the arrow in Fig. 10, so that by virtue of the relative eccentricity of the shaft portions 16 16ª the bed 18 is raised in relation to the connecting-link 15 and the type or die 18ª, Fig. 9, carried on the bed 18, is caused to make the desired impression. At each descent of the bed 18 the roller 135 abuts against the fixed arm or bracket 136, whereby through the sector 132 the shaft 16 16ª is turned in the direction opposite to that indicated by the arrow, whereby the bed 18 is lowered in relation to the connecting-link 15.

When the attendant fails to supply a blank sheet to the platens, and consequently requires to throw off an impression, he raises the crank-handle 147 into the position in which it is shown in Figs. 9 and 10, so that the pawl or hook 137 is removed from the path of the roller 135, and consequently no rotative movement will be imparted to the shaft 16 16ª, and the face of the type or die 18ª will therefore not reach the platen-blanket.

Figure 1:
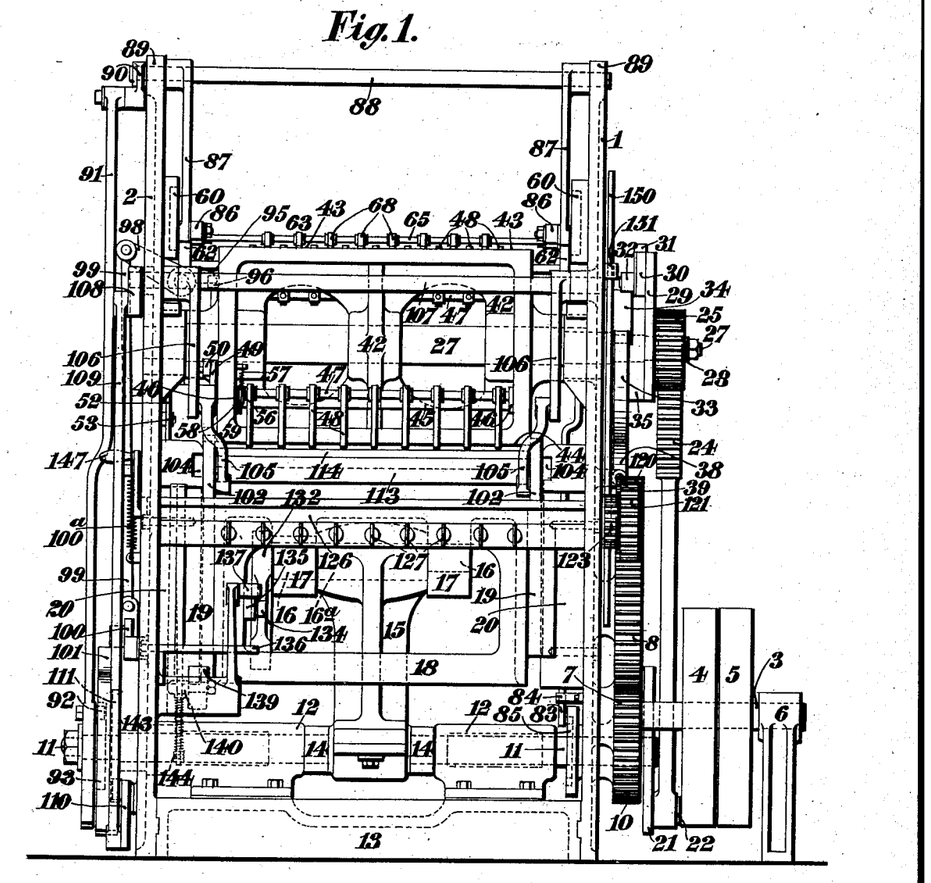
Figure 1 is a front elevation of one of the improved presses.
Figure 2:
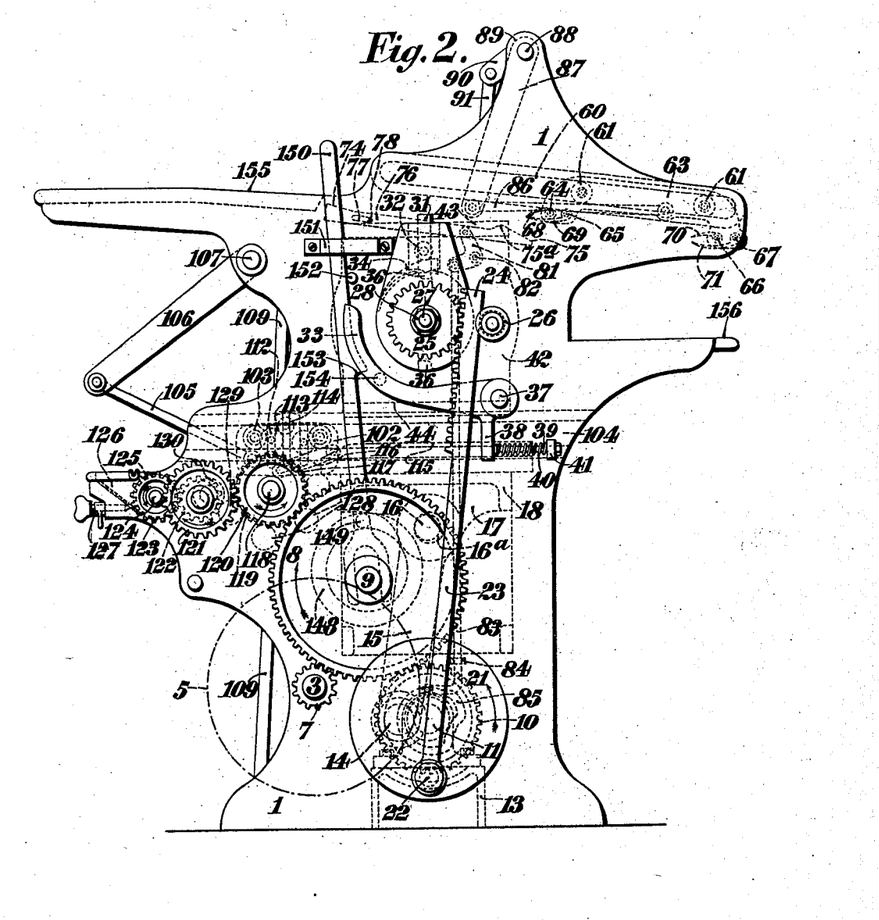
Figs. 2 and 3 are elevations of respectively the right and left hand sides of the press.
Figure 5:
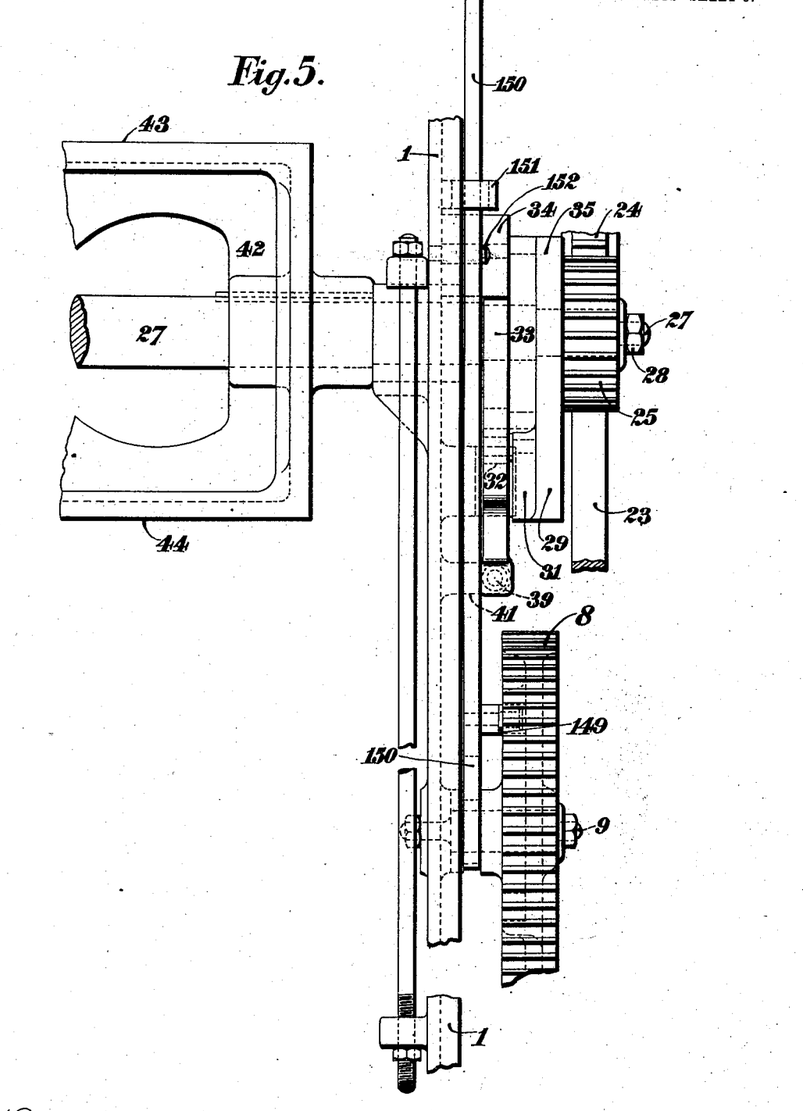
Fig. 5 is a front elevation, and Fig. 6 an elevation of the right-hand side of Fig. 5, of a portion of the press, showing the platen-operating mechanism and devices for securing double inking of a heavy form.

To provide for the double inking of a heavy form, the platen-frame 42 is caused to miss every alternate semirotation, so that each sheet or blank will receive two successive superimposed impressions, this result being obtained by the following mechanism. 148 is a cam, which, as shown in Figs. 2, 5, and 6, may conveniently be formed in the before-described spur-wheel 8 and engages with an antifriction-roller 149, pivoted on a hand-lever 150, whose lower end is forked and straddles the boss of the wheel 8 or the stud 9. The hand-lever 150 at its upper end passes through a loop-guide 151, and it is capable of being moved into either of the two positions in which it is shown in respectively full and dotted lines in Fig. 6, a pin 152 inserted in a hole in the side frame 1 or any other suitable device being provided for retaining the said lever in such positions, while allowing it to be reciprocated vertically by the cam 148. The hand-lever 150 is provided with a hook 153, which when the said lever is in the dotted-line position of Fig. 6 engages a stud or projection 154 on the before-described cam 33.

For ordinary single inking of the form the hand-lever 150 is secured in the full-line position of Fig. 6, and the cam 33 consequently causes the tooth 31 to engage with one of the recesses 36 at each oscillation of the plate 29. When, however, double inking of the form is required, the hand-lever 150 is secured in the dotted-line position, so that at alternate rotations of the crank-shaft 11 (the spur-wheel 8 being twice the diameter of the pinion 10) the cam 13 is drawn downward by the cam 148, lever 150, hook 153, and stud 154, and therefore is prevented from pressing the tooth 31 into engagement with the then lowermost recess 36, so that the next ensuing upward movement of the said tooth will have no effect on the notched disk 35.

In the operation of the before-described press the attendant moves each blank over the feed-board 155 until its rear edge projects slightly over the rear edge of the said board, so that at the next forward movement of the feed and delivery carriage 63 the feed-grippers 68 and 69 of said carriage will be able to seize the said blank. The platen-frame 42 being then locked in position with the platens 43 44 horizontal, the carriage 63 is moved forward, and when the feed-grippers 68 69 thereof are near the blank the cam-rod 76 is moved rearward and the cam 74 raises the grippers 68 to allow the blank to enter between 68 and 69, the cam-rod 76 being immediately thereafter moved forward to enable the grippers 68 (under the influence of the spring 79) to close upon the blank, which is thereby firmly gripped between 68 and 69. The carriage 63 then makes its rearward movement, and when the feed-grippers 68 69 are nearly over the then open flattened grippers 48 the roller 73, appertaining to the feed-grippers 68, strikes upon the cam-hump 75ᵃ and causes the said grippers to open and release the blank, which thereupon falls onto the then uppermost platen, whereon it is immediately thereafter secured by the closing of the appropriate platen-grippers 48. The carriage 63 then reaches its rearmost position, and the platen-frame 42 is unlocked and commences its semirotation, the carriage 63 remaining stationary until the platen is again brought to rest and locked with the blank in impressing position. At this juncture the type or die bed 18 commences to ascend, and the inking-carriage 102 commences to move forward, the inking-rollers 113 making one complete forward and backward movement over the type during each ascent of the bed 18, the inking-carriage 102 remaining inoperative in its rearmost position during each descent of the bed 18.

Figure 3:
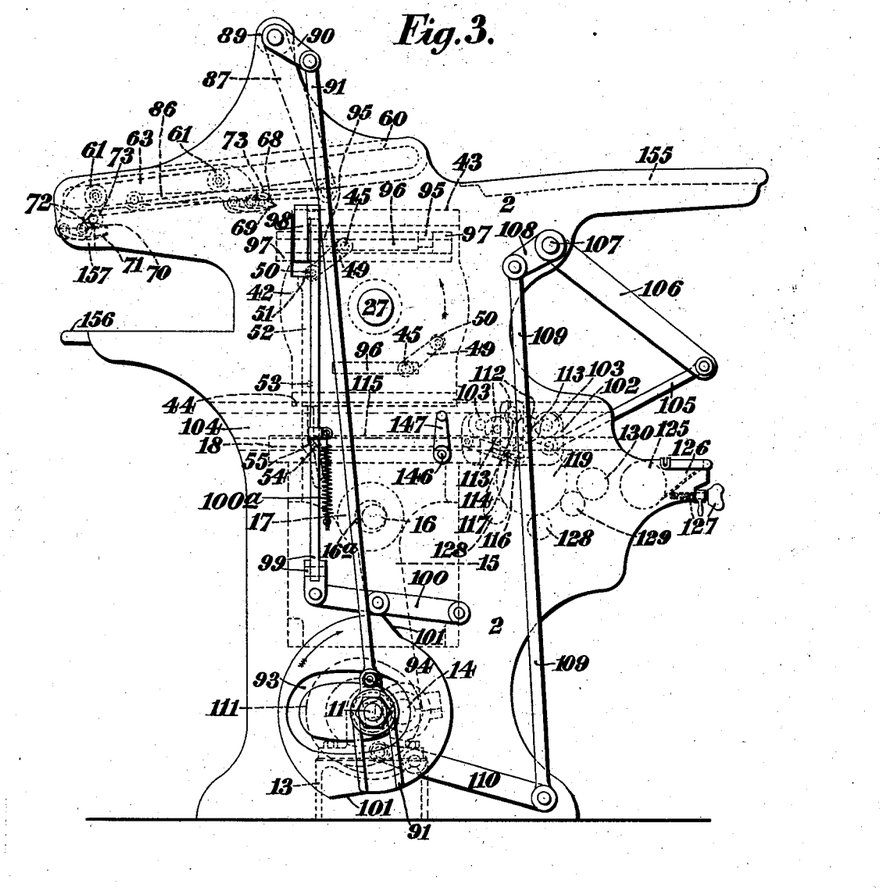
Figure 4:
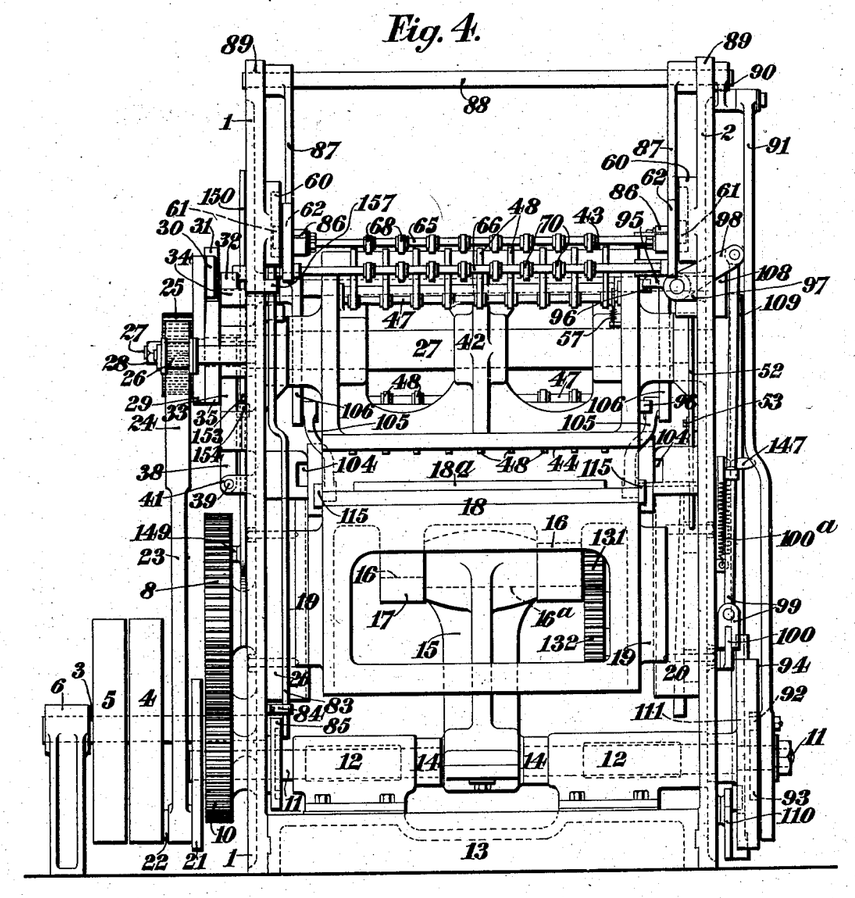
Fig. 4 is a rear elevation.

Provided that, as before explained, the crank-handle 147 occupies its horizontal position the blank receives its impression at the end of the upward stroke of the bed 18, and when the latter descends the platen-frame 42 makes its next semirotation, bringing a blank into impressing position and the impressed sheet into delivery position, the platen-frame being again locked at the end of said semirotative movement. The feed and delivery carriage 63 then makes its forward movement, and when near its foremost position the cam-rod 76 is moved upward and rearward, so as to act on the rollers 73, and thereby raise the gripper-jaws 68 and 70, the former for admitting a fresh blank and the latter for admitting the impressed blank, the cam-rod 76 afterward being moved forward and downward to allow of the said blank being gripped by the respective grippers 68 69 and 70 71. The carriage 63 is then moved backward, bringing the fresh blank onto the then uppermost platen, as before explained, and carrying the impressed blank over the delivery-board 156, a stationary cam or projection 157, Figs. 3 and 13, at this juncture serving to effect the release of the said impressed blank by moving upward the roller 73, appertaining to the delivery-gripper 70, as shown in Fig. 3, when the latter is moved up to it.

I claim—

1. In a platen-press the combination with the fixed frame and vertical guides thereon, a bed reciprocally movable in the guides and a crank-shaft and connecting-rod operatively connecting the bed and crank-shaft, of an adjustable eccentric device in the crank-shaft and bed-connecting devices, a spur-gear for the eccentric, a spur-sector pivoted to the bed engaging the gear, a projection on the sector, a fixed abutment in the path of the sector projection, a hook pivoted to the fixed frame, a handle operatively connected with the hook for moving it into and out of the path of the sector projection, a platen-frame, a plurality of platens on, and a shaft fixed to, the platen-frame, bearings for the shaft in the fixed frame, a spur-wheel loose on the platen-shaft, a toothed rack gearing with the said spur-wheel and reciprocated by the crank-shaft, a notched disk fast on the platen-shaft, a pawl on the spur-wheel engaging the notched disk, two cams in the path of the pawl, one movable and the other fast on the fixed frame, for engaging and disengaging the pawl and disk, a spring for the movable cam, a hook adjustable on the main frame engaging the movable cam, a rotating cam in operative connection with the hook and crank-shaft, stops on the platen-frame, catches movable on the main frame, cam mechanism operatively connected with the catches moving them into and out of the path of the said stops, shafts journaled in the platen-frame, arms on the said shafts, a cam operatively connecting some of these arms with the movable bed, gripper-shafts carried in the other of said arms, grippers adjustable on, and spring-actuated arms, fixed to, the gripper-shafts, abutments on the platen-frame, for the spring-actuated arms, an inking-carriage, horizontal guides therefor in the main frame, cam mechanism in operative connection with the inking-carriage for reciprocating it over the bed while the latter is in motion, slotted bearings in the inking-carriage for the inking-rollers, rails for the said rollers fixed to the bed, and pivoted to the bed and main frame, ink-distributing devices for the inking-carriage feed and delivery boards, a feed and delivery carriage, cam mechanism in operative connection with said carriage for reciprocating it over the feed-board, platen-frame and delivery-board, gripper-shafts in the feed and delivery carriage, grippers adjustable on the said shafts, actuating-arms on the gripper-shafts, a cam on the fixed frame and a cam-rod movable in the path of the actuating-arms and cam mechanism operatively connecting the cam-rod with the crank-shaft, all substantially as set forth.

2. In a platen-press the combination with the fixed frame, a bed vertically movable therein, a platen, and crank mechanism operatively connected with the movable bed, of an adjustable eccentric device interposed between the crank mechanism and bed, a spur-gear for the eccentric, a spur-sector pivoted to the bed engaging the gear, a projection on the sector, a stationary abutment in the path of the sector projection, a hook pivoted to the fixed frame and a handle operatively connected with the hook for moving it into and out of the path of the sector projection substantially as set forth.

3. In a platen-press the combination with the fixed frame, a platen-frame rotatable therein and having a plurality of platens, and a shaft for said platen-frame, of a spur-wheel loose on the platen-shaft, a reciprocating toothed rack gearing with said spur-wheel, operative devices for the rack, a notched disk fast on the platen-shaft, a pawl on the spur-wheel engaging the notched disk, two cams in the path of the pawl, one movable and the other fast on the fixed frame for engaging and disengaging the pawl and disk and a spring for the movable cam substantially as set forth.

4. In a platen-press the combination with the fixed frame, a platen-frame rotatable therein having a plurality of platens, and a shaft for said platen-frame, of a notched disk fast on the platen-shaft, a pawl capable of engaging the notched disk, operative devices connected with the main shaft and pawl for oscillating the latter about the platen-shaft, two cams in the path of the pawl, one movable, and the other fast on the fixed frame, for engaging and disengaging the pawl and disk, a spring for the movable cam, a hook adjustable on the main frame engaging the movable cam and a cam in operative connection with the hook and crank-shaft substantially as set forth.

5. In a platen-press the combination with the fixed frame, vertical guides therein, a bed reciprocally movable in the guides, and a platen-frame rotatable in the fixed frame and having a plurality of platens, of a gripper-shaft journaled in the platen-frame, arms on said shaft, a lever pivoted on the machine-frame, a cam on one end of the lever in operative contact with one of the said arms on the opposite end of the said lever adapted to be rocked by the movable bed, a spring-actuated arm fixed to the gripper-shaft and an abutment on the platen-frame for the spring-actuated arm.

6. In a platen-press the combination with the fixed frame, a platen-frame rotatable in the fixed frame and having a plurality of platens, and feed and delivery boards on either side of the platen-frame, of guides in the fixed frame above the platen-frame, a feed and delivery carriage reciprocally movable in the guides, cam mechanism reciprocating the said carriage over the feed-board, platen-frame and delivery-board, gripper-shafts in the carriage, grippers adjustable on said shafts, actuating-arms on the gripper-shafts, a cam on the fixed frame and a cam-rod movable in the path of the actuating-arms and operative devices for the cam-rod substantially as set forth.

7. In a platen-press the combination with the fixed frame, a platen-frame rotatable in the fixed frame and having a plurality of platens, feed and delivery boards on either side of the platen-frame, of a feed and delivery carriage reciprocally movable over the feed-board, platen-frame and delivery-board, gripper-shafts in the carriage, grippers and actuating-arms on said shafts, an adjustable cam-rod, a pivotal and slidable connection between the cam-rod and fixed frame, and cam, lever and link mechanism for the cam-rod substantially as set forth.

In witness whereof I have hereunto set my hand in the presence of two witnesses.

EDWARD THOMAS CLEATHERO.

Witnesses:
HERBERT PARKER,
F. H. JEFFERIS.